United States Patent [19]
St. Clair et al.

[11] Patent Number: 5,910,541
[45] Date of Patent: *Jun. 8, 1999

[54] TELECHELIC POLYMERS AND HETEROTELECHELIC POLYDIENE BLOCK POLYMERS WITH DUAL CURE SYSTEMS

[75] Inventors: David John St. Clair, Houston; James Robert Erickson, Katy, both of Tex.

[73] Assignee: Shell Oil Company, Houston, Tex.

[ * ] Notice: This patent is subject to a terminal disclaimer.

[21] Appl. No.: 08/932,969

[22] Filed: Sep. 18, 1997

Related U.S. Application Data

[62] Division of application No. 08/631,759, Apr. 12, 1996, Pat. No. 5,721,318, which is a division of application No. 08/519,885, Aug. 28, 1995, Pat. No. 5,576,388, which is a continuation-in-part of application No. 08/320,808, Oct. 11, 1994, abandoned.

[51] Int. Cl.$^6$ .............................. C08L 53/00; C08L 53/02; C08L 33/08; C08L 67/02
[52] U.S. Cl. .............................. 525/99; 525/89; 525/92 F; 525/98
[58] Field of Search .............................. 525/89, 92 F, 98, 525/99, 314

[56] References Cited

U.S. PATENT DOCUMENTS

| | | | |
|---|---|---|---|
| 3,269,978 | 8/1966 | Short et al. | 260/41.5 |
| 3,900,532 | 8/1975 | Dietrich et al. | |
| 4,237,245 | 12/1980 | Halasa et al. | 525/272 |
| 4,518,753 | 5/1985 | Richards et al. | 526/177 |
| 5,115,019 | 5/1992 | Marx et al. | 525/65 |
| 5,149,895 | 9/1992 | Coolbaugh et al. | 526/173 |
| 5,169,910 | 12/1992 | Corley | 525/481 |
| 5,191,024 | 3/1993 | Shibata et al. | 525/314 |
| 5,210,359 | 5/1993 | Coolbaugh et al. | 526/173 |
| 5,229,464 | 7/1993 | Erickson et al. | 525/314 |
| 5,247,026 | 9/1993 | Erickson et al. | 525/331.9 |
| 5,321,093 | 6/1994 | Bronstert et al. | 525/314 |
| 5,332,783 | 7/1994 | Dillman et al. | 525/92 |
| 5,576,388 | 11/1996 | St. Clair et al. | 525/99 |

FOREIGN PATENT DOCUMENTS

| | | |
|---|---|---|
| 0396780 A1 | 11/1989 | European Pat. Off. . |
| 0441485 A2 | 1/1991 | European Pat. Off. . |
| 55-98243 | 1/1979 | Japan . |
| 62-201983 | 9/1987 | Japan . |
| 1-22094 | 1/1989 | Japan . |
| 4-153252 | 10/1990 | Japan . |
| 2/409745 | 12/1990 | Japan . |

OTHER PUBLICATIONS

"Vinyl Ethers: Versatile Monomers for Coatings Applications," W. J. Burlant, J. S. Plotkin, F. J. Vara, International Specialty Products, RadTech Asia '91, Osaka, Japan, Apr. 1991.
Derwent Accession No. 76–87324X/37 for French Patent No. 2,297,863, Sep. 17, 1976, Agence Nat. Valorisation.
Derwent Accession No. 92–211565/26 for Japanese Patent No. 4–132706, May 7, 1992, Noppon Shokuhai Co., Ltd.

*Primary Examiner*—Robert E. Sellers
*Attorney, Agent, or Firm*—Donald F. Haas

[57] ABSTRACT

A pressure sensitive structural or sealant composition comprises (a) from 15 to 95% by weight of a telechelic polymer such as a hydroxyl-functional telechelic polymer and from 5 to 85% by weight of a heterotelechelic polydiene block polymer wherein at least one of the functionalities is the same as the functionality of the telechelic polymer, such as a heterotelechelic polydiene block polymer with hydroxyl and glycidyl ether funciontialities, and (b) a dual curing system wherein one curing agent cures the teolechelic polymer and the common functionality on the heterotelechelic polydiene block polymer such as a polyisocyanate, and the other curing agent cures the other functionality on the heterotelechelic polydiene block polymer at higher temperatures but does not cure under conditions required to cure the telechelic polymer, such as a polycarboxylic acid, polycarboxylic acid anhydride or a catalyst.

2 Claims, No Drawings

TELECHELIC POLYMERS AND HETEROTELECHELIC POLYDIENE BLOCK POLYMERS WITH DUAL CURE SYSTEMS

This is a division, of application Ser. No. 08/631,759, filed Apr. 12, 1996, now U.S. Pat. No. 5,721,318, which is a division of application Ser. No. 08/519,885, filed Aug. 28, 1995, now U.S. Pat. No. 5,576,388, which is a continuation-in-part of application Ser. No. 08/320,808, filed Oct. 11, 1994, which is now abandoned.

BACKGROUND OF THE INVENTION

The present invention relates to pressure sensitive adhesive compositions which can be further cured after being applied to a substrate, making them behave as structural adhesives. More particularly, the present invention provides adhesive and sealant compositions based on a mixture of a telechelic polymer having hydroxyl functionality with a heterotelechelic polymer having both hydroxyl and another type of functionality and a dual curing system such as an isocyanate and a melamine.

Pressure sensitive adhesives based on block copolymers of conjugated dienes and/or vinyl aromatic hydrocarbons are well known. They have the particular advantage that they give an instantaneous bond under light pressure. The limitation of pressure sensitive adhesives is that they lack the cohesive strength to bear high loads. Structural and semi-structural adhesives based on such polymers are also well known. Their advantage is that they cure to give adhesives which can bear quite high loads. Their disadvantage is that they must be applied as liquids in order to achieve good bonding and so the assembly must be fixtured until the adhesives sets, usually by chemical cure, but sometimes by cooling from the melt.

It would be highly advantageous to provide a pressure sensitive adhesive which would give an instantaneous bond while having enough cohesive strength that fixturing requirements would be less demanding or unnecessary and which would cure further upon some subsequent treatment, thereby increasing its cohesive strength so it becomes a structural or semi-structural adhesive. The present invention provides such a composition which is useful in both adhesives and sealants.

SUMMARY OF THE INVENTION

The present invention relates to pressure sensitive structural adhesive and sealant compositions comprising a polymer system and a curing system wherein the polymer system is comprised of from 95 to 15 percent by weight of a hydroxy functional telechelic polymer, from 5 to 85 percent by weight of a heterotelechelic polymer having at least one hydroxyl group and at least one other functional group which does not react significantly with the curing agent for the telechelic polymer, and wherein the curing system is comprised of a curing agent for the telechelic polymer and a separate curing agent for the other functionality on the heterotelechelic polymer which will not cure the heterotelechelic polymer under conditions used to cure the telechelic polymer but will cure it under more severe conditions, i.e., higher temperature and/or pressure and/or exposure to radiation.

In a preferred embodiment, the polymer system is comprised of a hydroxyl functional telechelic diol or polyol polymer and the heterotelechelic polymer is a monohydroxylated polydiene polymer which also has epoxidized olefin functionality. The dual curing system preferably is comprised of an isocyanate curing agent to cure through the hydroxyl groups at ambient temperatures to form a pressure sensitive adhesive or sealant and an amino resin to cure through the epoxy functionality upon baking to form a structural adhesive or sealant.

DETAILED DESCRIPTION OF THE INVENTION

The polymer system is comprised of both a telechelic polymer and a heterotelechelic polymer. A telechelic polymer is one which has a particular type of functional group attached at the ends of the molecule. Telechelic polymers are typically diols, triols and star polyols. Telechelic polymers can be made by the well known process of ring opening polymerization of cyclic monomers with an initiator, typically a polyfunctional alcohol. Examples are the ring opening polymerization of monomers like ethylene oxide, propylene oxide, butylene oxide, or caprolactone, initiated by ethylene glycol to give diols or by glycerol to give triols. Another well known process to make telechelic polymers is by anionic polymerization with a hydroxy functional initiator followed by is reaction with a capping agent such as ethylene oxide which, after termination, yields a hydroxyl group on the ends of the polymer.

A heterotelechelic polymer is one which has one type of functional group at or near one end of the molecule and another type of functional group at or near the other end of the molecule. As will be seen from the following discussion, the functionality may be throughout an end block of a block copolymer and the block copolymer is a heterotelechelic polymer within the scope of this invention. There must be different functionalities and they must be separated, such as in the epoxidized monols described below, where an epoxidized end block of a diblock polymer is separated from a terminal hydroxyl group by the entire length of the second block. Anionic polymerization is also a convenient way to make heterotelechelic polymers. For example, polymers can be made which have ethylenic unsaturation in the molecule via polymerization of a diene monomer and also have a terminal functional group via a capping reaction, for example a hydroxyl group via capping with ethylene oxide. The ethylenic unsaturation may be useful as is in the heterotelechelic polymer or it can be used for further functionalization reactions, such as epoxidation.

Anionic polymerizations are usually carried out in solution. When polymerized to high molecular weight, the polymer will generally be recovered as a solid such as a crumb, a powder, a pellet or the like. When polymerized to low molecular weight, it may be recovered as a liquid such as in the present invention.

In general, when solution anionic techniques are used, copolymers of conjugated diolefins, optionally with vinyl aromatic hydrocarbons, are prepared by contacting the monomer or monomers to be polymerized simultaneously or sequentially with an anionic polymerization initiator such as group IA metals, their alkyls, amides, silanolates, napthalides, biphenyls or anthracenyl derivatives. It is preferred to use an organo alkali metal (such as sodium or potassium) compound in a suitable solvent at a temperature within the range from about −150° C. to about 300° C., preferably at a temperature within the range from about 0° C. to about 100° C. Particularly effective anionic polymerization initiators are organo lithium compounds having the general formula:

$$FLi_n$$

wherein R is an aliphatic, cycloaliphatic, aromatic or alkyl-substituted aromatic hydrocarbon radical having from 1 to about 20 carbon atoms and n is an integer of 1 to 4.

Conjugated diolefins which may be polymerized anionically include those conjugated diolefins containing from about 4 to about 24 carbon atoms such as 1,3-butadiene, isoprene, piperylene, methylpentadiene, phenyl-butadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl (vinyl) aromatic hydrocarbons which may be copolymerized include vinyl aryl compounds such as styrene, various alkyl-substituted styrenes, alkoxy-substituted styrenes, vinyl napthalene, alkyl-substituted vinyl napthalenes and the like.

The hydroxyl groups of both the telechelic and heterotelechelic polymers of the present invention will react with the isocyanate curing agent at ambient conditions to form a pressure sensitive adhesive or sealant composition while the other type of functionality will only cure upon baling at a temperature of at least 100° C. to make a structural adhesive or sealant composition.

The telechelic polymer provides the strength to the ambient cured pressure sensitive adhesive or sealant composition. If the telechelic polymer is a diol or polyol, there are many types which can be used. Polydiene diols and polyols (radial), as well as their saturated analogs, can be used, as well as polyether, polyester, and acrylic diols and polyols (radial). The preferred telechelic polymers for use in the present invention are diols and polyols of conjugated dienes, preferably hydrogenated diols and polyols of conjugated dienes.

There are many types of heterotelechelic polymers which can be used herein. As stated above, one end of the heterotelechelic polymer will have the same functional group as the telechelic polymer. The other end will have a different type of functional group which does not react with its crosslinker under the same conditions used to crosslink the telechelic polymer. Heterotelechelic polymers may include those wherein protected functional initiators and/or protected functional capping agents are included into the polymer. Heterotelechelic polymers can also be made by functionalization reactions on telechelic polymers.

In the preferred embodiment of this invention the polymer system is a combination of hydroxy functional telechelic and heterotelechelic polymers wherein the other functionality on the heterotelechelic polymer is an olefinic epoxy. The curing system is an isocyanate for ambient cure and a melamine resin for bake cure after the adhesive has been applied. However, this invention is not restricted to these chemistries. The following are some examples of other suitable telechelic and heterotelechelic polymers. If the telechelic polymer has hydroxyl functionality, the heterotelechelic polymer will also have a hydroxyl group and also another type of functional group such as C=C unsaturation (for sulfur cure or melamine cure), acrylic unsaturation (for free radical cure via peroxide or radiation), epoxidized olefin (for cationic cure via a blocked Lewis acid or for radiation cure or for melamine cure), or glycidyl ether epoxy (for polycarboxylic acid or polycarboxylic acid anhydride cure or catalytic cure). If the telechelic polymer has acrylic unsaturation (for free radical cure at ambient temperature via peroxide or radiation), the heterotelechelic polymer will also have an acrylic group and another functional group such as hydroxy functionality (for melamine or blocked isocyanate cure), olefinic unsaturation, glycidyl ether epoxy, or epoxidized olefin functionality. If the telechelic polymer has glycidyl ether functionality (for ambient cure with aliphatic amines), the heterotelechelic polymer will have glycidyl ether epoxy functionality and another functional group such as olefinic unsaturation, epoxidized olefin, or hydroxy functionality. There are many other combinations for functional groups and curing systems and thus there are many possibilities for dual curing systems.

The telechelic polydiene polymers are preferably synthesized by anionic polymerization of conjugated diene hydrocarbon monomers, such as butadiene or isoprene with lithium initiators. The process steps are known as described in U.S. Pat. Nos. 4,039,593, Re. 27, 145, and U.S. Pat. No. 5,376,745 which descriptions are incorporated herein by reference. Polymerization begins when a dilithium or polylithium initiator builds a living polymer backbone at each lithium site. Typical dilithium living polymer structures containing conjugated diene hydrocarbons are:

Li-B-X-B-Li

Li-B-A-X-A-B-Li

Li-A-B-A-X-A-B-A-Li wherein B represents polymerized units of one or more conjugated diene hydrocarbons such as butadiene or isoprene, A represents polymerized units of one or more conjugated dienes and/or vinyl aromatic compounds such as styrene, and X is the residue of the diinitiator, such as the initiator formed by reaction of diisopropenyl benzene with two moles of sec-butyllithium. B can also be a copolymer of a conjugated diene and a vinyl aromatic compound.

The anionic polymerization is done in solution in an organic solvent, typically a hydrocarbon like hexane, cyclohexane or benzene, although polar solvents such as tetrahydrofuran can also be used. When the conjugated diene is 1,3-butadiene and when the resulting polymer will be hydrogenated, the anionic polymerization of butadiene in a hydrocarbon solvent like cyclohexane is typically controlled with structure modifiers such as diethylether or glyme (1,2-diethoxyethane) to obtain the desired amount of 1,4-addition. As described in Re 27,145 which is incorporated by reference herein, the level of 1,2-addition of butadiene in the polymer or copolymer can greatly affect viscosity and elastomeric properties after hydrogenation.

The optimum balance between low viscosity and high solubility in a hydrogenated polybutadiene polymer occurs at about a 60/40 ratio of 1,4-butadiene/1,2-butadiene. This butadiene microstructure is achieved during polymerization at 50° C. in cyclohexane containing about 6% by volume of diethylether or about 1000 ppm of glyme. This is not a concern when isoprene is the monomer used to make the hydrogenated polydiene polymer and so the polymerization can be done in a pure hydrocarbon solvent with no modifier. The hydrogenated polymers exhibit improved heat stability and weatherability in the final adhesive or sealant.

After polymerization of the monomers is complete, the hydroxyl groups are added by capping the living polymer chain ends with a capping agent, typically ethylene oxide, and terminating with a proton donor, typically methanol.

A saturated, dihydroxy polydiene polymer can also be made using a mono-lithium initiator which contains a hydroxyl group which has been blocked as the silyl ether. Details of the polymerization procedure can be found in U.S. Pat. No. 5,376,745, which is herein incorporated by reference. A suitable initiator is hydroxypropyllithium in which the hydroxyl group is blocked as the tert-butyl-dimethylsilyl ether. This mono-lithium initiator can be used to polymerize isoprene or butadiene, with or without styrene, in hydrocarbon or polar solvent. The molar ratio of initiator to monomer determines the molecular weight of the polymer. The living polymer is then capped with one mole of ethylene oxide and terminated with one mole of methanol to yield the monohydroxy polydiene polymer. The silyl ether is then removed by acid catalyzed cleavage in the presence of water yielding the desired dihydroxy polydiene polymer.

Polyhydroxylated polydiene polymers can be obtained using similar technology. Mulitfunctional-lithium initiators can be prepared from reaction of sec-butyllithium with diisopropenylbenzene at less than a 2:1 molar ratio. These multi-lithium initiators can then be used to polymerize butadiene in solvent. The living polymers would then be capped with ethylene oxide and terminated with methanol to give the polyhydroxylated polydiene polymer. Alternatively, the protected mono-lithium initiator can be used to polymerize butadiene or isoprene. The living polymer can be coupled with a multifunctional coupling agent and the blocking agent would then be removed, regenerating the hydroxyl group. A trifunctional coupling agent like methyltrimethoxysilane would yield a tri-hydroxy polydiene polymer. A tetrafunctional coupling agent like silicon tetrachloride would yield a tetra-hydroxy polydiene polymer. A propagating coupling agent like divinylbenzene would yield a multi-hydroxy polydiene polymer having up to 20 hydroxyl groups per polydiene polymer.

The heterotelechelic monohydroxylated polydiene polymers are also synthesized by anionic polymerization of conjugated diene hydrocarbons, such as butadiene or isoprene, with lithium initiators. The process steps are the same as for the multifunctional telechelic polymers except polymerization commences with a monolithium initiator instead of the multilithium initiator.

The hydroxylated polydiene polymers of this invention will have hydroxyl equivalent weights between about 500 and about 20,000, preferably between 1000 and 15,000, and most preferably between 2000 and 10,000. Thus, for monohydroxy polydiene polymers, suitable peak molecular weights will be between 500 and 20,000. Below the lower molecular weight range, cost becomes prohibitively high because of the high cost of the polymerization initiator. Above the higher molecular weight range, viscosity becomes somewhat high making mixing and application of the adhesive more difficult and, at such high hydroxyl equivalent weights, it becomes difficult to accomplish the required polyurethane chemistry. Preferably, the telechelic polymer is a diol or polyol of at least one conjugated diene such as polybutadiene diol or polyisoprene diol or it may have the formula

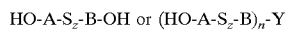

HO-A-$S_z$-B-OH or (HO-A-$S_z$-B)$_n$-Y wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers, S is a vinyl aromatic hydrocarbon block, Y is a coupling agent, z is 0 or 1, and n is an integer from 1 to 20.

The heterotelechelic polymer preferably is an epoxidized monohydroxylated polydiene polymer which is comprised of at least two polymerizable ethenically unsaturated monomers wherein at least one is a diene monomer that yields unsaturation suitable for epoxidation. The hydroxylated heterotelechelic polymers are most preferably block copolymers of at least two conjugated dienes, preferably isoprene and butadiene, and, optionally, a vinyl aromatic hydrocarbon wherein a hydroxyl group is attached at one end of the polymer molecule These polymers may be hydrogenated or unhydrogenated.

The preferred epoxidized monohydroxylated polydiene polymer of the present invention is described in detail in copending, commonly assigned, U.S. patent application Ser. No. 08/320,805 entitled, "Monohydroxylated Diene Polymers and Epoxidized Derivatives Thereof", filed concurrently with the parent application of this application and which is herein incorporated by reference, and has the structural formula A-$S_z$-B-OH  (I)

wherein A and B are polymer blocks which may be homopolymer blocks of conjugated diolefin monomers, copolymer blocks of conjugated diolefin monomers, or copolymer blocks of diolefin monomers and monoalkenyl aromatic hydrocarbon monomers. These polymers may contain up to 60% by weight of at least one vinyl aromatic hydrocarbon, preferably styrene. The A blocks have a greater concentration of more highly substituted aliphatic double bonds than the B blocks have. Thus, the A blocks have a greater concentration of di-, tri-, or tetra-substituted unsaturation sites (aliphatic double bonds) per unit of block mass than do the B blocks. This produces a polymer wherein the most facile epoxidation occurs in the A blocks and thus, when these polymers are epoxidized, a heterotelechelic polymer is formed with the hydroxyl on one end and the epoxy groups in the other end block. The A blocks have a molecular weight of from 100 to 6000, preferably 500 to 4,000, and most preferably 1000 to 3000, and the B blocks have a molecular weight of from 1000 to 15,000, preferably 2000 to 10,000, and most preferably 3000 to 6000. S is a vinyl aromatic hydrocarbon block which may have a molecular weight of from 100 to 10,000. z is 0 or 1. Either the A or the B block may be capped with a miniblock of polymer, 50 to 1000 molecular weight, of a different composition, to compensate for any initiation, tapering due to unfavorable copolymerization rates, or capping difficulties. These polymers are epoxidized such that they contain from 0.2 to 7.0 milliequivalents (meq) of epoxy per gram of polymer.

The most highly preferred polymers for use herein are diblock polymers which fall within the scope of formula (I) above. The overall molecular weight of such diblocks may range from 1500 to 15000, preferably 3000 to 7000. Either of the blocks in the diblock may contain some randomly polymerized vinyl aromatic hydrocarbon as described above. For example, where I represents isoprene, B represents butadiene, S represents styrene, and a slash (/) represents a random copolymer block, the diblocks may have the following structures:

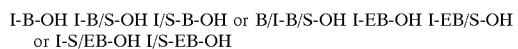

I-B-OH I-B/S-OH I/S-B-OH or B/I-B/S-OH I-EB-OH I-EB/S-OH or I-S/EB-OH I/S-EB-OH where EB is hydrogenated butadiene, -EB/S-OH means that the hydroxyl source is attached to a styrene mer, and -S/EB-OH signifies that the hydroxyl source is attached to a hydrogenated butadiene mer. This latter case, -S/EB-OH, requires capping of the S/EB "random copolymer" block with a mini EB block to compensate for the tapering tendency of the styrene prior to capping with ethylene oxide. These diblocks are advantageous in that they exhibit lower viscosity and are easier to manufacture than the corresponding triblock polymers. The hydroxyl is attached to the butadiene block because the epoxidation proceeds more favorably with isoprene and there will be a separation between the functionalities on the polymer. The isoprene blocks may also be hydrogenated.

Certain triblock copolymers are also preferred for use herein. Such triblocks usually include a styrene block or randomly copolymerized styrene to increase the polymers glass transition temperature, compatibility with polar materials, strength, and room temperature viscosity. These triblocks include the following specific structures:

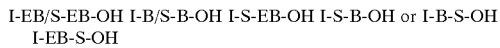

The latter group of polymers specified in the last line above wherein the styrene block is external are represented by the formula

 (II)

where A, B, and S are as described above.

The heterotelechelic hydroxylated polydienes synthesized by anionic polymerization will also have olefinic unsaturation. Although these polymers may be useful as is, the olefinic unsaturation can also be epoxidized. Epoxidation of the base polymer can be effected by reaction with organic peracids which can be preformed or formed in situ. Suitable preformed peracids include peracetic and perbenzoic acids. In situ formation may be accomplished by using hydrogen peroxide and a low molecular weight fatty acid such as formic acid. Alternatively, hydrogen peroxide in the presence of acetic acid or acetic anhydride and a cationic exchange resin will form a peracid. The cationic exchange resin can optionally be replaced by a strong acid such as sulfuric acid or p-toluenesulfonic acid. The epoxidation reaction can be conducted directly in the polymerization cement (polymer solution in which the polymer was polymerized) or, alternatively, the polymer can be redissolved in an inert solvent. These methods are described in more detail in U.S. Pat. Nos. 5,229,464 and 5,247,026 which are herein incorporated by reference.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" molecular weight of the narrow molecular weight distribution observed. Usually, the peak value is between the number and the weight average. The peak molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pore size directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modem Size-Exclusion Liquid Chromatography*, M. W. Yau, J. J. Kirkland, D. D. Bly, John Wiley and Sons, New York, New York, 1979.
2. *Light Scattering From Polymer Solutions*, M. B. Huglin, ed., Academic Press, New York, New York, 1972.
3. W. K. Kai and A. J. Havlik, *Applied Optics*, 12, 541 (1973).
4. M. L. McConnell, *American Laboratory*, 63, May, 1978.

If desired, these block copolymers can be partially hydrogenated. Hydrogenation may be effected selectively as disclosed in U.S. Reissue Pat. No. 27,145 which is herein incorporated by reference. The hydrogenation of these polymers and copolymers may be carried out by a variety of well established processes including hydrogenation in the presence of such catalysts as Raney Nickel, nobel metals such as platinum and the like, soluble transition metal catalysts and titanium catalysts as in U.S. Pat. No. 5,039,755 which is also incorporated by reference. A particularly preferred catalyst is a mixture of nickel 2-ethylhexanoate and triethylaluminum. The polymers may have different diene blocks and these diene blocks may be selectively hydrogenated as described in U.S. Pat. No. 5,229,464 which is also herein incorporated by reference. The telechelic polydiene polymers of this invention are preferably hydrogenated such that at least 90%, preferably at least 95%, of the carbon to carbon double bonds become saturated. It is preferred that the heterotelechelic polydiene polymers be partially unsaturated in order that the carbon to carbon double bonds can be used as is or can be used for further functionalization such as to make the epoxidized polymers of this invention. The level of unsaturation in the heterotelechelic polymers should be from 0.2 to 7.5 meq of double bonds per gram of polymer.

The amount of the telechelic polymer used in the polymer part of the adhesive or sealant composition may range from 95 to 15% by weight. If less than 15% is used, the pressure sensitive adhesive will not have sufficient strength and if more than 95% is used, there will be too little of the heterotelechelic polymer to cure and increase cohesive strength. The amount of the dual curing system will depend on the type of functionality in the heterotelechelic polymer and on the particular curing system used. Normally, however, the hydroxyl functional telechelic and heterotelechelic polymers will be cured with a stoichiometric amount of isocyanate. If olefinic unsaturation is the other functionality in the heterotelechelic polymer, then a sulfur-based crosslinking system will be used at from 0.5 to 6% by weight. If epoxidized olefin is the other functionality in the heterotelechelic polymer, then an amino resin crosslinker will be used at from 2 to 20% by weight.

The polyisocyanate used in this invention can be an aliphatic or an aromatic polyisocyanate or a mixture of the two. Aliphatic polyisocyanates are generally preferred since they will give sealants and adhesives having lighter color and better durability than aromatic polyisocyanates. Since the telechelic and heterotelechelic saturated hydroxylated polydiene polymers can have functionalities of as little as 1 or 2 hydroxyl groups per molecule, it is necessary that the isocyanate have a functionality of greater than 2 in order to assure that the polyurethane sealant or adhesive composition will crosslink into a cohesive mass. Typically, the polyisocyanate will have a functionality of 3 or more isocyanate (NCO) functional groups per molecule. However, it is possible to use difunctional or monofunctional isocyanates in combination with polyfunctional isocyanates. The dual curing system preferably contains an isocyanate having a equivalent weight between 50 and 500.

Examples of suitable aromatic polyfunctional isocyanates are 1,2,4-benzene triisocyanate, polymethylene polyphenyl isocyanate (Mondur® MR ex Bayer), the adduct of toluene diisocyanate with trimethylolpropane (Mondur® CB-60 ex Bayer). Examples of suitable aliphatic polyfunctional isocyanates are the isocyanurate of isophorone diisocyanate (Desmodur® Z4370 ex Bayer) and the isocyanurate of hexane diisocyanate (Desmodur® N-3390 ex Bayer). Desmodur® Z4370 has been found to be a particularly effective triisocyanate for this invention because it has excellent compatibility with the saturated, hydroxylated polydiene polymers of this invention. It gives clear, colorless sealants and adhesives with excellent tack and peel and should also give excellent durability, even under exposure to sunlight.

Although isocyanates having 3 or more NCO groups per molecule will be the major component of the polyisocyanate curing agent, small amounts of diisocyanates and monoisocyanates can also be used. Suitable diisocyanates are toluene diisocyanate, diphenyl methane diisocyanate, isophorone diisocyanate, dicyclohexyl methane diisocyanate and hexane diisocyanate. Suitable monoisocyanates are toluene isocyanate, phenyl isocyanate and cyclohexyl isocyanate.

Polyisocyanate adducts can also be used in this invention. These are typically made by capping a polypropylene oxide diol or triol or a polycaprolactone diol or triol with a diisocyanate.

When the heterotelechelic polymer has olefinic epoxy functionality, the crosslinking agents which are useful in the present invention are amino resins. For the purposes of this invention, an amino resin is a resin made by reaction of a material bearing NH groups with a carbonyl compound and an alcohol. The NH bearing material is commonly urea, melamine, benzoguanamine, glycoluril, cyclic ureas, thioureas, guanidines, urethanes, cyanamides, etc. The most common carbonyl component is formaldehyde and other carbonyl compounds include higher aldehydes and ketones. The most commonly used alcohols are methanol, ethanol, and butanol. Other alcohols include propanol, hexanol, etc. American Cyanamid (renamed CYTEC) sells a variety of these amino resins, as do other manufacturers. American Cyanamid's literature describes three classes or "types" of amino resins that they offer for sale.

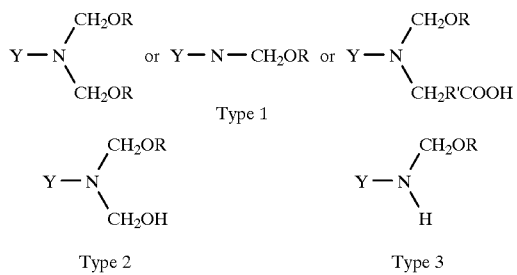

where Y is the material that bore the NH groups, the carbonyl source was formaldehyde and R is the alkyl group from the alcohol used for alkylation. Although this type of description depicts the amino resins as monomeric material of only one pure type, the commercial resins exist as mixtures of monomers, dimers, trimers, etc. and any given resin may have some character of the other types. Dimers, trimers, etc. also contain methylene or ether bridges. Generally, type 1 amino resins are preferred in the present invention.

The amino resin must be compatible with both the telechelic and the heterotelechelic polymer. A compatible amino resin is defined as one which gives a phase stable blend with the polymers at the desired concentration and at the temperature at which the compositions will be mixed and applied. The dual curing system preferably contains an amino resin having an equivalent weight between 50 and 500.

For example, the following type 1 amino resins can be used to achieve the purpose of the present invention: CYMEL® 1156—a melamine-formaldehyde resin where R is $C_4H_9$, CYMEL® 1170—a glycoluril- formaldehyde resin where R is $C_4H_9$, CYMEL® 1141—a carboxyl modified amino resin where R is a mixture of $CH_3$ and i-$C_4H_9$, and BEETL® 80—a urea-formaldehyde resin where R is $C_4H_9$. All of these products are made by American Cyanamid Company and are described in its publication 50 *Years of Amino Coating Resins,* edited and written by Albert J. Kirsch, published in 1986 along with other amino resins useful in the present invention.

CYMEL® 1170 is the following glycoluril-formaldehyde resin where R is $C_4H_9$:

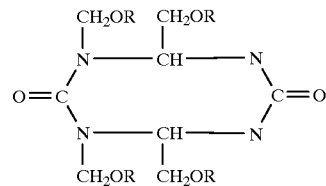

BEETLE® 80 is a urea-formaldehyde resin where R is $C_4H_9$ whose ideal monomeric structure is depicted:

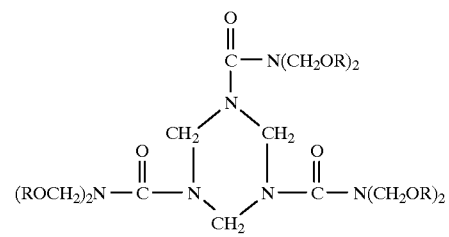

The adhesive and sealant compositions of this invention may consist only of the telechelic and heterotelechelic polymers along with the dual curing system crosslinkers. However, it may be necessary for a formulator to combine a variety of ingredients together with the polymers of the present invention in order to obtain products having the proper combination of properties (such as adhesion, cohesion, durability, low cost, etc.) for particular applications. Although a suitable formulation might contain only the polymers and curing agents, in most adhesive and sealant applications, suitable formulations would also contain various combinations of resins, plasticizers, fillers, solvents, stabilizers and other ingredients such as asphalt. The following are some typical examples of formulating ingredients for adhesives and sealants.

In order to obtain high pressure sensitive adhesive tack, it may be necessary to add an adhesion promoting or tackifying resin that is compatible with the polymers. A common tackifying resin is a diene-olefin copolymer of piperylene and 2-methyl-2-butene having a softening point of about 95° C. This resin is available commercially under the tradename Wingtack® 95 and is prepared by the cationic polymerization of 60% piperlene, 10% isoprene, 5% cyclo-pentadiene, 15% 2-methyl-2-butene and about 10% dimer, as taught in U.S. Pat. No. 3,577,398. Other tackifying resins may be employed wherein the resinous copolymer comprises 20–80 weight percent of piperylene and 80–20 weight percent of 2-methyl-2-butene. The resins normally have ring and ball softening points as determined by ASTM method E28 between about 80° C. and 115° C.

Aromatic resins may also be employed as tackifying agents, provided that they are compatible with the particular polymers used in the formulation. Normally, these resins should also have ring and ball softening points between about 80° C. and 115° C. although mixtures of aromatic resins having high and low softening points may also be used. Useful resins include coumarone-indene resins, polystyrene resins, vinyl toluene-alpha methylstyrene copolymers and polyindene resins.

Other adhesion promoting resins which are also useful in the compositions of this invention include hydrogenated rosins, esters of rosins, polyterpenes, terpenephenol resins and polymerized mixed olefins, lower softening point resins and liquid resins. An example of a liquid resin is Adtac® LV resin from Hercules. To obtain good thermo-oxidative and color stability, it is preferred that the tackifying resin be a saturated resin, e.g., a hydrogenated dicyclopentadiene resin such as Escore® 5000 series resin made by Exxon or a hydrogenated polystyrene or polyalphamethylstyrene resin such as Regalre® resin made by Hercules. The amount of adhesion promoting resin employed varies from 0 to 400 parts by weight per hundred parts polymer (php), preferably between 20 to 350 php, most preferably 20 to 150 php. The selection of the particular tackifying agent is, in large part, dependent upon the specific polymers employed in the adhesive composition.

A composition of the instant invention may contain plasticizers, such as rubber extending plasticizers, or compounding oils or organic or inorganic pigments and dyes. Rubber compounding oils are well-known in the art and include both high saturates content oils and high aromatics content oils. Preferred plasticizers are highly saturated oils, e.g. Tufflo® 6056 and 6204 oil made by Arco and process oils, e.g. Shellflex® 371 oil made by Shell. The amounts of rubber compounding oil employed in the invention composition can vary from 0 to about 500 php, preferably between about 0 to about 100 php, and most preferably between about 0 and about 60 php.

Various types of fillers and pigments can be included in the formulation. This is especially true for exterior adhesives or sealants in which fillers are added not only to create the desired appeal but also to improve the performance of the adhesives or sealants such as their weatherability. A wide variety of fillers can be used. Suitable fillers include calcium carbonate, clays, talcs, silica, zinc oxide, titanium dioxide and the like. The amount of filler usually is in the range of 0 to about 800 php depending on the type of filler used and the application for which the adhesive or sealant is intended. An especially preferred filler is titanium dioxide.

Stabilizers known in the art may also be incorporated into the composition. These may be for protection during the life of the article against, for example, oxygen, ozone and ultra-violet radiation or for protection against degradation during mixing, application or curing. Typical stabilizers are antioxidants, usually hindered phenolic compounds, and UV inhibitors, usually benzophenone or benzotriazole compounds or hindered amine light stabilizers. The amount of stabilizer used depends highly on the application for which the composition is intended but generally, the stabilizers will be used at from 0.1 to 10 php.

Most adhesive and sealant compositions based on this invention will contain some combination of the various formulating ingredients disclosed herein. No definite rules can be offered about which ingredients will be used. The skilled formulator will choose particular types of ingredients and adjust their concentrations to give exactly the combination of properties needed in the composition for any specific adhesive or sealant application. So, beyond the telechelic polymer, the heterotelechelic polymer and the two curing agent systems, the formulator will choose to use or not to use among the various resins, fillers and pigments, plasticizers, oligomers, stabilizers and solvents.

The key to the concept of the present invention is to make a pressure sensitive adhesive or sealant which can be further cured after it is applied, making it behave as a structural adhesive or sealant. The adhesive or sealant is based on a mixture of a telechelic polymer, such as the preferred hydrogenated polydiene diol, with a heterotelechelic polymer, such as the preferred epoxidized monohydroxylated polydiene polymer, and a dual curing system including, for example, an isocyanate and an amino resin. A pressure sensitive adhesive composition (or pressure sensitive sealant composition) is formed which can be applied to a substrate. Later, when the assembly is baked, the composition cures through amino resin curing of the epoxy groups, further increasing the cohesive strength and modulus of the adhesive or sealant composition and making it perform more like a structural adhesive than a pressure sensitive adhesive. A specific use for such compositions is to make a free film which is a pressure sensitive adhesive between two layers of release paper. This free film is then used to adhere automobile parts together, such as hood and door reinforcements, with enough strength to hold them in place until the body is baked. Upon baking, the adhesive cures further, giving a structural or at least semi-structural bond holding the parts permanently in place. This use has the additional benefit that the free film of pressure sensitive adhesive between two layers of release paper can be die cut to exactly the size and shape needed for the particular application.

EXAMPLES

In the following examples, the telechelic polymer (Polymer A) is a 3500 molecular weight (MW) hydrogenated polybutadiene diol (HO-EB-OH). Three heterotelechelic polymers were used. All three were 6000 molecular weight. Polymer C is a 2000 MW polyisoprene block—2500 MW polystyrene/1500 MW polybutadiene random copolymer block -OH (I-S/EB-OH) in which the polybutadiene has been selectively hydrogenated and the polyisoprene has been epoxidized to a level of 1.5 meq epoxy/gm. Polymer D is a 2000 MW polyisoprene block—4000 MW polybutadiene block -OH (1-ES OH) in which the polybutadiene has been selectively hydrogenated and the polyisoprene has been epoxidized to 1.5 meq/gm. Polymer E is the same as Polymer D except the polyisoprene has not been epoxidized, but retains 1.5 meq/gm of double bonds. Polymer B is a non-heterotelechelic polymer used for comparison with the heterotelechelic polymers. It is a 3000 MW hydrogenated polybutadiene monol (EB-OH). The HO-EB-OH was used with each of the four monols, with and without tackifying resin, by curing them through their hydroxyl groups with a trifunctional isocyanate, Desmodur® Z4370, to give a polyurethane pressure sensitive adhesive (PSA) which also contained the melamine resin, CYMEL® 1156. The intent was that this PSA could be used as any normal PSA to adhere two substrates together, giving an instantaneous bond under light pressure and having sufficient shear strength to hold the pieces together under modest load. Then, after the adhesive was in place, the assembly could be heated to accomplish the melamine cure through the epoxy groups and improve the shear strength enough that the adhesive could bear high enough load that it could perform as a structural adhesive.

To test this approach, formulations 1–4 in the table were prepared, using a 35/65 diol/monol ratio by weight. To 80 parts by weight (pbw) of this diol/monol mixture was added 18 pbw of the butylated melamine resin, CYMEL® 1156, and 2 pbw of dodecyl benzene sulfonic acid catalyst, CYCAT® 600 (CYCAT® 600 is a 70% w solution of acid in isopropyl alcohol), to catalyze the melamine/epoxy reaction when the adhesive is baked. This mixture was dissolved at 64% w solids in dry xylene to give the hydroxyl side of the two-component polyurethane. Immediately before casting films of the adhesives, Desmodur® Z-4370 was added at a stoichiometric 1/1 NCO/OH ratio (including the alcohol introduced with the CYCAT® 600), along with 0.04% w dibutyl tin dilaurate catalyst (DABCO T-12), to catalyze the isocyanate/hydroxyl reaction. These adhesive solutions were cast on 1 mil thick polyester film using a #52 wire rod. The films were dried/cured for 5 days at ambient temperature before testing. Formulations 1–4 contained no tackifying resin.. Formulations 5–8 are the same as 14 except they also contain tackifying resin, REGALREZ® 1085, at the same concentration as diol/monol.

Standard tests for rolling ball tack, Polyken probe tack, 180° peel and holding power were run on the adhesives after ambient temperature cure. This is the condition the adhesives would be in when they are being used as pressure sensitive adhesives. Test specimens for 180° peel, holding power and Shear Adhesion Failure Temperature (SAFT) were prepared and baked 1 hour at 100° C. This is the condition the adhesives would be in when they should be performing as structural adhesives. SAFT was not measured on the ambient cured adhesives because they would probably cure as the temperature in the test was increased.

The SAFT was measured by 1"×1" Mylar to Mylar lap joint with a 1 kg weight. SAFT measures the temperature at which the lap shear assembly fails under load. Rolling Ball Tack (RBT) is the distance a steel ball rolls on the adhesive film with a standard initial velocity (Pressure Sensitive Tape Council Test No. 6). Small numbers indicate aggressive tack. Holding Power (HP) is the time required to pull a standard area (½ in.×½ in.) of tape from a standard test surface (steel, Kraft paper) under a standard load (2 kg), in shear at 2° antipeel (Pressure Sensitive Tape Council Method No. 7). Long times indicate high adhesive strength. 180® peel was determined by Pressure Sensitive Tape Council Method No. 1. Large numbers indicate high strength when peeling a test tape from a steel substrate. Polyken probe tack (PPT) was determined by ASTM D-2979. High numbers for PPT indicate aggressive tack.

After the adhesives had dried and cured for 5 days at ambient temperature, the hydroxyl/isocyanate reaction was essentially complete. All of the films were coherent and, when touched, no adhesive was transferred to the finger. The films were qualitatively rated for clarity and finger tack. Adhesives 2 and 6 stood out as unique. They were more hazy than the others, showing Polymer C has poor compatibility with Polymer A, and had poor finger tack, probably reflecting the impact of the styrene content in Polymer C. All the other adhesives were fairly clear and generally had good finger tack.

Adhesives 1 and 5 are the control adhesives, without and with tackifying resin, in which the monol (Polymer B) used has only the single hydroxyl group and is not heterotelechelic. After ambient cure, these adhesives have good tack and they fail cohesively in the peel and holding power tests. After baking, holding powers improve, the peel strength of adhesive 5 increases and the failure mechanism in the peel test on adhesive 1 switches from cohesive to adhesive failure. However, the holding power and SAFT of these two formulations after baking are much lower than those of the other formulations.

Adhesives 2 and 6 have poor tack and high holding power after ambient cure. Peel and holding power do not change upon baking. The high peel, high holding power and high SAFT of adhesive 6 are impressive. This suggests that if higher than normal bonding pressure can be applied to make the assembly to offset the poor tack after ambient cure, adhesive 6 may perform quite well as a structural adhesive when baked.

Adhesives 3 and 7 used Polymer D. This monol contains no styrene so it should maintain low glass transition temperature (Tg) and good tack in the ambient cured adhesive. It not only has the hydroxyl group to participate in the ambient cure urethane reaction but also has epoxy groups to participate in the melamine reaction upon baking. Results in the table show that, after ambient cure, adhesive 3 has only fair tack but excellent holding power. After baking, adhesive 3 continues to have excellent holding power and has excellent SAFT. The failure mechanism in the peel test is adhesive failure, suggesting that adhesive 3 has substantial cohesive strength after ambient cure and that its cohesive strength increases upon baking since its peel value drops. The presence of tackifying resin in adhesive 7 improves the Polyken probe tack and finger tack in the ambient cured adhesive. The bake cured adhesive has excellent holding power and SAFT. The change in failure mechanism in the peel test from a partial cohesive failure in the ambient cured adhesive to a purely adhesive failure in the bake cured adhesive suggests that the cohesive strength of the adhesive increased as desired upon baking.

Adhesives 4 and 8 performed well, probably because the C=C unsaturation participated in the melamine curing reaction. Indeed, results in the table show that adhesive 4 after ambient cure has good tack but low holding power and fails cohesively in the peel test. However, after baking, it has excellent holding power and SAFT and the failure mechanism becomes adhesive in the peel test. These results suggest a clear increase in cohesive strength upon baking. Adhesive 8 containing tackifying resin has even better Polyken probe tack than adhesive 4. It too shows an increase in holding power and peel strength upon baking, again suggesting an increase in cohesive strength.

TABLE 1

| | 1 | 2 | 3 | 4 | 5 | 6 | 7 | 8 |
|---|---|---|---|---|---|---|---|---|
| Composition, pbw | | | | | | | | |
| Polymer A | 1225 | 1225 | 1225 | 1225 | 1225 | 1225 | 1225 | 1225 |
| Polymer B | 2275 | | | | 2275 | | | |
| Polymer C | | 2275 | | | | 2275 | | |
| Polymer D | | | 2275 | | | | 2275 | |
| Polymer E | | | | 2275 | | | | 2275 |
| Desmodur ® Z-4370 | 663 | 524 | 524 | 524 | 663 | 524 | 524 | 524 |
| REGALREZ ® 1085 | | | | | 3500 | 3500 | 3500 | 3500 |
| DABCO T-12 | 2.08 | 2.01 | 2.01 | 2.01 | 2.08 | 2.01 | 2.01 | 2.01 |
| CYMEL ® 1156 | 768 | 768 | 768 | 768 | 768 | 768 | 768 | 768 |
| CYCAT ® 600 | 71 | 71 | 71 | 71 | 71 | 71 | 71 | 71 |
| Xylene | 2444 | 2421 | 2421 | 2421 | 4777 | 4754 | 4754 | 4754 |
| Composition, % w | | | | | | | | |
| Polymer A | 25.9 | 26.4 | 26.4 | 26.4 | 14.9 | 15.1 | 15.1 | 15.1 |
| Monol (B, C, D or E) | 48.1 | 49.1 | 49.1 | 49.1 | 27.6 | 28.0 | 28.0 | 28.0 |
| Z-4370 solids | 9.8 | 7.9 | 7.9 | 7.9 | 5.6 | 4.5 | 4.5 | 4.5 |
| REGALREZ ® 1085 | 0.0 | 0.0 | 0.0 | 0.0 | 42.5 | 43.0 | 43.0 | 43.0 |
| CYMEL ® 1156 | 16.2 | 16.6 | 16.6 | 16.6 | 9.3 | 9.4 | 9.4 | 9.4 |
| Qualitative rating of films after 5 days ambient cure | | | | | | | | |
| Clarity | Slight Haze | Very Hazy | Clear | Slight Haze | Clear | Slight Haze | Clear | Clear |
| Finger Tack | Good | None | Fair | Good | Good | None | Good | Good |
| Properties after ambient cure | | | | | | | | |
| Thickness, mil | 2.1 | 1.9 | 2.0 | 2.0 | 2.3 | 1.9 | 2.0 | 2.0 |
| Rolling Ball Tack, cm | 4 | 23 | 13 | 13 | 4 | >28 | 18 | 15 |
| Polyken Probe Tack, kg | 0.52 | 0.26 | 0.32 | 0.63 | 1.30 | 0.15 | 0.67 | 1.00 |
| 180° Peel to CRS, pli | 1.3c | 1.1a | 1.4a | 1.4c | 3.0c | 6a/c | 7a/c | 3.1c |
| Holding Power, 1 × 1, 2 Kg to CRS (D36), min | 74c | >4000 | >4000 | 23c | 13c | >4000 | >4000 | 32c |
| Properties after bake cure* | | | | | | | | |
| 180° Peel to CRS, pli | 0.8a | 0.9a | 0.5a | 1.2a | 4.5c | 4.8a | 1.4a | 4.5c |
| Holding Power, 1 × 1, 2 Kg to CRS (D36), min | 2500 | >4000 | >4000 | >4000 | 1100 | >4000 | >4000 | >4000 |
| SAFT to Mylar, ° C. | 95 | >168 | >168 | >168 | 75 | >168 | >168 | 144 | a adhesive failure
c cohesive failure

We claim:

1. A pressure sensitive adhesive or sealant composition comprising:
   (a) from 15 to 95 percent by weight of a hydroxyl-functional telechelic polymer and from 5 to 85 percent by weight of a heterotelechelic polydiene block polymer With hydroxyl functionality and glycidyl ether functionality which does not react significantly with a polyisocyanate at ambient temperature; and
   (b) a dual curing system comprising a polyisocyanate which cures the hydroxyl groups of the telechelic and heterotelechelic polymers at ambient temperature and a curing agent selected from the group consisting of a polycarboxylic acid, a polycarboxylic acid anhydride, and a catalyst that cures the glycidyl ether functionality of the heterotelechelic polydiene block polymer upon baking at higher temperature.

2. The compositions of claim 1 wherein the polyisocyanate has an equivalent weight between 50 and 500 which is the curing agent for the telechelic polymer.

* * * * *